United States Patent
Kikuchi et al.

(10) Patent No.: US 12,221,544 B2
(45) Date of Patent: Feb. 11, 2025

(54) ACRYLONITRILE-BUTADIENE RUBBER COMPOSITION, AND LAMINATE HAVING LAYER OF THE COMPOSITION

(71) Applicant: MITSUI CHEMICALS, INC., Tokyo (JP)

(72) Inventors: Yoshiharu Kikuchi, Sodegaura (JP); Kotaro Ichino, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 978 days.

(21) Appl. No.: 16/971,839

(22) PCT Filed: Mar. 8, 2019

(86) PCT No.: PCT/JP2019/009447
§ 371 (c)(1),
(2) Date: Aug. 21, 2020

(87) PCT Pub. No.: WO2019/176797
PCT Pub. Date: Sep. 19, 2019

(65) Prior Publication Data
US 2021/0079199 A1    Mar. 18, 2021

(30) Foreign Application Priority Data

Mar. 16, 2018    (JP) ................................. 2018-049539
Mar. 16, 2018    (JP) ................................. 2018-049541

(51) Int. Cl.
| | | |
|---|---|---|
| B32B 25/08 | (2006.01) | |
| B32B 1/08 | (2006.01) | |
| B32B 27/08 | (2006.01) | |
| C08K 5/14 | (2006.01) | |
| C08L 9/02 | (2006.01) | |
| C08L 23/06 | (2006.01) | |
| C08L 31/04 | (2006.01) | |
| C08L 51/00 | (2006.01) | |

(52) U.S. Cl.
CPC ................. *C08L 9/02* (2013.01); *B32B 1/08* (2013.01); *B32B 25/08* (2013.01); *C08K 5/14* (2013.01); *C08L 23/06* (2013.01); *C08L 31/04* (2013.01); *C08L 51/003* (2013.01); *B32B 2250/02* (2013.01); *B32B 2250/242* (2013.01); *B32B 2270/00* (2013.01); *B32B 2307/7242* (2013.01); *B32B 2319/00* (2013.01); *B32B 2323/04* (2013.01); *B32B 2331/04* (2013.01); *B32B 2597/00* (2013.01); *C08L 2201/14* (2013.01); *C08L 2205/02* (2013.01)

(58) Field of Classification Search
CPC .. B32B 2250/02; B32B 2270/00; B32B 25/14
See application file for complete search history.

(56) References Cited

U.S. PATENT DOCUMENTS

| | | | | |
|---|---|---|---|---|
| 5,902,655 | A | * | 5/1999 | Matsuoka ............... B32B 27/20 |
| | | | | 525/193 |
| 2009/0000684 | A1 | | 1/2009 | Shinoda et al. |
| 2010/0104787 | A1 | * | 4/2010 | Gong ...................... C08L 23/16 |
| | | | | 428/35.9 |
| 2017/0182386 | A1 | | 6/2017 | Inoue et al. |
| 2020/0230910 | A1 | | 7/2020 | Kikuchi et al. |

FOREIGN PATENT DOCUMENTS

| | | | |
|---|---|---|---|
| EP | 0 788 875 A1 | 8/1997 | |
| EP | 1 669 188 A1 | 6/2006 | |
| EP | 3 358 629 A1 | 8/2018 | |
| JP | H1121459 A * | 1/1999 | |
| JP | H11325330 A * | 11/1999 | |
| JP | 2002-019030 A | 1/2002 | |
| JP | 2009-006575 A | 1/2009 | |
| JP | 2010-269485 A | 12/2010 | |
| JP | 2014149961 A * | 8/2014 | ............. B32B 27/32 |
| JP | 2016089097 A * | 5/2016 | ............. B32B 27/18 |
| WO | WO-2017/057217 A1 | 4/2017 | |
| WO | WO-2018/151103 A1 | 8/2018 | |

OTHER PUBLICATIONS

Machine translation into English of JP-2014149961-A; Hagiwara et al (Year: 2014).*
Machine translation into English of JP-2016089097-A; Hagiwara et al (Year: 2016).*
Machine translation into English of JP-H1121459-A; Hanada et al (Year: 1999).*
Machine translation into English of JP-H11325330-A; Shimomura (Year: 1999).*
International Searching Authority, "International Preliminary Report on Patentability and Written Opinion," issued in connection with International Patent Application No. PCT/JP2019/009447, dated Sep. 22, 2020.
International Searching Authority, "International Search Report," issued in connection with International Patent Application No. PCT/JP2019/009447, dated May 28, 2019.
Rahaman et al, "High-Performance EMI Shielding Materials Based on Short Carbon Fiber-Filled Ethylene Vinyl Acetate Copolymer, Acrylonitrile Butadiene Copolymer, and Their Blends", Polymer Composites, DOI10.1002/pc.21212, 2011, pp. 1790-1805.

(Continued)

*Primary Examiner* — Karuna P Reddy
(74) *Attorney, Agent, or Firm* — FOLEY & LARDNER LLP

(57) ABSTRACT

An object of the present invention is to develop an NBR composition excellent in an adhesive strength with a saponified ethylene-vinyl acetate copolymer layer, and a laminate excellent in an adhesive strength of an NBR layer with a saponified ethylene-vinyl acetate copolymer layer; and the present invention relates to an acrylonitrile-butadiene rubber composition comprising an acrylonitrile-butadiene rubber and a silane-modified ethylene-vinyl acetate copolymer of 0 to 50 parts by mass with respect to 100 parts by mass of the acrylonitrile-butadiene rubber, and a laminate comprising an acrylonitrile-butadiene rubber layer comprising the composition and the saponified ethylene-vinyl acetate copolymer layer through an ethylene-vinyl acetate copolymer layer.

3 Claims, No Drawings

(56) References Cited

OTHER PUBLICATIONS

Razavi-Nouri et al; "Rheological behavior and morphology of acrylonitrile-butadiene rubber/poly(ethylene-co-vinyl acetate) blends filled by various organoclay contents", Applied Clay Science, doi.org/10.1016/j.clay.2017.05.021, 2017, vol. 145, pp. 1-10.

* cited by examiner

ACRYLONITRILE-BUTADIENE RUBBER COMPOSITION, AND LAMINATE HAVING LAYER OF THE COMPOSITION

RELATED APPLICATIONS

The present application claims priority under 37 U.S.C. § 371 to International Patent Application No. PCT/JP2019/009447, filed Mar. 8, 2019, which claims priority to and the benefit of Japanese Patent Application Nos. 2018-049539 and 2018-049541, both filed on Mar. 16, 2018. The contents of these applications are hereby incorporated by reference in their entireties.

TECHNICAL FIELD

The present invention relates to an acrylonitrile-butadiene rubber (NBR) composition improved in an adhesive strength with a saponified ethylene-vinyl acetate copolymer layer, and a laminate of a layer of the composition with a saponified ethylene-vinyl acetate copolymer layer.

BACKGROUND ART

For example, Automobiles, industrial machines, construction machines, motorbikes and farm machines are installed with various types of hoses such as radiator hoses for cooling engines, drain hoses for radiator overflow, heater hoses for indoor heating, air conditioner drain hoses, water supply hoses for wiper, roof drain hoses and protect hoses. For these hoses, there is used NBR, which is good in oil resistance, heat resistance and gas permeability resistance.

Depending on applications, however, an NBR single layer has a poor gas permeability resistance, and therefore there is proposed, for example, a laminate of the NBR layer with an ethylene-vinyl alcohol copolymer layer, which is better in a gas barrier property (Patent Literature 1).

However, despite an attempt of simply laminating an NBR layer with an ethylene-vinyl alcohol copolymer layer, it has been found that the adhesive strength is insufficient.

CITATION LIST

Patent Literature

Patent Literature 1: JP-A-2009-006575

SUMMARY OF INVENTION

Technical Problem

An object of the present invention is to develop an NBR composition excellent in an adhesive strength with a saponified ethylene-vinyl acetate copolymer layer, and a laminate excellent in an adhesive strength of an NBR layer with a saponified ethylene-vinyl acetate copolymer layer.

Solution to Problem

The present invention relates to the following [1] to [6].

[1] An acrylonitrile-butadiene rubber composition comprising an acrylonitrile-butadiene rubber and a silane-modified ethylene-vinyl acetate copolymer of 0 to 50 parts by mass with respect to 100 parts by mass of the acrylonitrile-butadiene rubber.

[2] A laminate, comprising an acrylonitrile-butadiene rubber layer comprising the composition according to item [1] and a saponified ethylene-vinyl acetate copolymer layer through an ethylene-vinyl acetate copolymer layer.

[3] The laminate according to item [2], wherein the ethylene-vinyl acetate copolymer layer comprises a silane-modified ethylene-vinyl acetate copolymer.

[4] The acrylonitrile-butadiene rubber composition according to item [1], comprising the acrylonitrile-butadiene rubber and the silane-modified ethylene-vinyl acetate copolymer of 2 to 50 parts by mass with respect to 100 parts by mass of the acrylonitrile-butadiene rubber.

[5] The acrylonitrile-butadiene rubber composition according to item [1] or item [4], further comprising 1.7 to 20 parts by mass of dicumyl peroxide.

[6] A laminate, comprising a layer of an acrylonitrile-butadiene rubber composition according to item [4] or item [5], and a saponified ethylene-vinyl acetate copolymer layer.

Advantageous Effects of Invention

The acrylonitrile-butadiene rubber composition comprising a silane-modified ethylene-vinyl acetate copolymer according to the present invention is excellent in the adhesive strength when laminated with a saponified ethylene-vinyl acetate copolymer layer, and therefore can suitably be used for various applications requiring oil resistance, heat resistance and gas permeability resistance.

Further the laminate having the ethylene-vinyl acetate copolymer layer between the acrylonitrile-butadiene rubber layer and the saponified ethylene-vinyl acetate copolymer layer, since being excellent in interlaminar adhesive strength, can suitably be used for various applications requiring oil resistance, heat resistance and gas permeability resistance.

DESCRIPTION OF EMBODIMENTS

《Acrylonitrile-Butadiene Rubber》

An acrylonitrile-butadiene rubber (NBR) layer (hereinafter, abbreviated to "NBR layer" in some cases) constituting the laminate of the present invention and an acrylonitrile-butadiene rubber (NBR) constituting an acrylonitrile-butadiene rubber composition (hereinafter, abbreviated to "NBR composition" in some cases) is a synthetic diene rubber obtained by emulsion polymerizing acrylonitrile with butadiene. NBR is generally classified, according to the amount of acrylonitrile bonded therein, into 5 ranks of very high (43% or higher), high (36 to 42%), moderately high (31 to 35%), middle (25 to 30%) and low (24% or lower), and the moderately high is a general-purpose type.

《Silane-Modified Ethylene-Vinyl Acetate Copolymer》

A silane-modified ethylene-vinyl acetate copolymer contained in NBR according to the present invention is a modified copolymer made by graft modifying an ethylene-vinyl acetate copolymer with an unsaturated silane compound. The amount of the unsaturated silane compound to be grafted is usually 0.01 to 5% by weight and preferably 0.02 to 3% by weight.

The melt flow rate (MFR) of the silane-modified ethylene-vinyl acetate copolymer according to the present invention is, as a value measured according to JIS K7210 [190° C., 2.16 kg load], usually in the range of 1.6 to 6.4 g/10 min and preferably 1.6 to 4.6 g/10 min.

The content of vinyl acetate in the ethylene-vinyl acetate copolymer to be modified with silane is usually in the range of 5 to 50% by weight and preferably 5 to 40% by weight.

The melt flow rate (MFR) of the ethylene-vinyl acetate copolymer according to the present invention is, as a value measured according to JIS K7210 [190° C., 2.16 kg load], usually in the range of 1.6 to 6.4 g/10 min and preferably 1.6 to 4.6 g/10 min.

A method of graft modifying an ethylene-vinyl acetate copolymer with an unsaturated silane compound can be carried out by various known methods, for example, a method of carrying out graft modification in the presence of a radical initiator or in the non-presence thereof. At this time, when the graft modification is carried out in the presence of a radical initiator, graft modification with the unsaturated silane compound can efficiently be carried out.

Such a radical initiator to be used is, for example, an organic peroxide or an azo compound. Such a radical initiator specifically includes benzoyl peroxide, dichlorobenzoyl peroxide, dicumyl peroxide, di-t-butyl peroxide, 2,5-dimethyl-2,5-di(peroxide benzoate)hexyne-3,1,4-bis(t-butylperoxyisopropyl)benzene, lauroyl peroxide, t-butyl peracetate, 2,5-dimethyl-2,5-di-(t-butyl peroxide)hexyne-3, 2,5-dimethyl-2,5-di(t-butyl peroxide)hexane, t-butyl perbenzoate, t-butyl perphenylacetate, t-butyl perisobutyrate, t-butyl per-sec-octoate, t-butyl perpivalate, cumyl perpivalate, t-butyl perdiethyl acetate; azobisisobutyronitrile, and dimethyl azoisobutyrate.

Among these, there are preferably used dialkyl peroxides such as dicumyl peroxide, di-t-butyl peroxide, 2,5-dimethyl-2,5-di(t-butylperoxy)hexyne-3, 2,5-dimethyl-2,5-di(t-butylperoxy) hexane, and 1,4-bis(t-butylperoxyisopropyl) benzene.

<Unsaturated Silane Compound>

Examples of the unsaturated silane compound to be grafted to the ethylene-vinyl acetate copolymer include various known compounds, vinylsilanes such as vinyltrimethoxysilane, vinyltriethoxysilane, vinyl(β-methoxyethoxy)silane and vinyltriacetoxysilane, and acrylic silanes such as acryloxypropyltrimethoxysilane and methacryloxypropyltrimethoxysilane.

«NBR Composition»

The NBR composition of the present invention is a composition comprising, with respect to 100 parts by mass of the above NBR, 0 to 50 parts by mass, preferably 2 to 50 parts by mass and more preferably 5 to 20 parts by mass of the above silane-modified ethylene-vinyl acetate copolymer.

When the NBR composition of the present invention comprises, in addition to the silane-modified ethylene-vinyl acetate copolymer, 1.7 to 20 parts by mass, preferably 3.4 to 10.2 parts by mass of dicumyl peroxide, the adhesive strength with the saponified ethylene-vinyl acetate copolymer layer is more improved.

In the NBR according to the present invention, in addition to the above silane-modified ethylene-vinyl acetate copolymer and dicumyl peroxide, other components can be contained according to desired purposes, in such a range not to impair advantageous effects of the present invention. As the other components, there may be contained at least one selected from fillers, crosslinking aids, vulcanization accelerators, vulcanizing aids, softeners, antioxidants, processing aids, activators, heat-resistant stabilizers, weathering stabilizers, antistatic agents, colorants, lubricants, thickeners, foaming agents and foaming aids. Each of these additives may be used singly in one kind or concurrently used in two or more kinds.

<Filler>

The filler contained in the NBR according to the present invention is a known rubber reinforcing agent contained in NBR, and usually carbon black or an inorganic substance referred to as an inorganic reinforcing agent.

The filler according to the present invention specifically includes carbon blacks, such as Asahi #55G, Asahi #60G (the forgoing, manufactured by Asahi Carbon Co., Ltd.) and Seast (for example, SRF, GPF, FEF, MAF, HAF, ISAF, SAF, FT or MT) (manufactured by Tokai Carbon Co., Ltd.), these carbons surface-treated with, for example, a silane coupling agent, silica, activated calcium carbonate, fine powder talc, fine powder silicic acid, light precipitated calcium carbonate, heavy calcium carbonate, talc and clay.

These fillers may be used singly or as a mixture of two or more.

As the filler according to the present invention, preferably used are, for example, silicas such as hydrophilic silica and hydrophobic silica, carbon black, light precipitated calcium carbonate, heavy calcium carbonate, talc and clay.

When the NBR according to the present invention contains the filler, the filler may be contained, with respect to 100 parts by mass of the above NBR, usually in the range of 100 to 300 parts by mass and preferably 100 to 250 parts by mass.

<Crosslinking Aid, Vulcanization Accelerator and Vulcanizing Aid>

When dicumyl peroxide is used as the crosslinking agent, the crosslinking aid may be used concurrently. Examples of the crosslinking aid include sulfur; quinone dioxime crosslinking aids such as p-quinone dioxime; acrylic crosslinking aids such as ethylene glycol dimethacrylate and trimethylolpropane trimethacrylate; allyl crosslinking aids such as diallyl phthalate and triallyl isocyanurate; maleimide crosslinking aids; divinylbenzene; and metal oxides such as a zinc oxide (for example, ZnO #1• zinc oxide grade 2 (JIS Standard (K1410)), manufactured by HakusuiTech Co., Ltd.), magnesium oxide, zinc flower [zinc oxide, for example, "META-Z 102" (trade name, manufactured by Inoue Calcium Corp.)], and active zinc flower.

When the crosslinking aid is used, the content of the crosslinking aid in the NBR is, with respect to 1 mol of dicumyl peroxide, usually 0.5 to 10 mol, preferably 0.5 to 7 mol and more preferably 1 to 6 mol.

Examples of the vulcanization accelerator according to the present invention include thiazole vulcanization accelerators such as N-cyclohexyl-2-benzothiazolesulfenamide, N-oxydiethylene-2-benzothiazolesulfenamide, N,N'-diisopropyl-2-benzothiazolesulfenamide, 2-mercaptobenzothiazole (for example, Sanceler M (trade name, manufactured by Sanshin Chemical Industry Co., Ltd.)), 2-(4-morpholinodithio)benzothiazole (for example, Nocceler MDB-P (trade name, manufactured by Ouchi Shinko Chemical Industrial Co., Ltd.)), 2-(2,4-dinitrophenyl)mercaptobenzothiazole, 2-(2,6-diethyl-4-morpholinothio)benzothiazole and dibenzothiazyl disulfide (for example, Sanceler DM (trade name, manufactured by Sanshin Chemical Industry Co., Ltd.)); guanidine vulcanization accelerators such as diphenylguanidine, triphenylguanidine and diorthotolylguanidine; aldehyde-amine vulcanization accelerators such as acetaldehyde-aniline condensates and butyraldehyde-aniline condensates; imidazoline vulcanization accelerators such as 2-mercaptoimidazoline; thiuram vulcanization accelerators such as tetramethylthiuram monosulfide (for example, Sanceler TS (trade name, manufactured by Sanshin Chemical Industry Co., Ltd.)), tetramethylthiuram disulfide (for example, Sanceler TT (trade name, manufactured by Sanshin Chemical Industry Co., Ltd.)), tetraethylthiuram disulfide (for example, Sanceler TET (trade name, manufactured by Sanshin Chemical Industry Co., Ltd.)), tetrabutylthiuram disulfide (for example, Sanceler TBT (trade name, manufactured by Sanshin Chemical Industry Co., Ltd.)) and dipentamethylenethivam tetrasulfide (for example, Sanceler TRA (trade name, manufactured by Sanshin Chemical Industry Co., Ltd.)); dithioate salt vulcanization accelerators such as zinc dimethyldithiocarbamate, zinc diethyldithiocarbamate, zinc dibutyldithiocarbamate (for example, Sanceler PZ, Sanceler BZ and Sanceler EZ (trade names, manufactured by Sanshin Chemical Industry Co., Ltd.)) and tellurium diethyldithiocarbamate; thiourea vulcanization accelerators such as ethylenethiourea (for example, Sanceler BUR, Sanceler 22-C (trade names, manufactured by Sanshin Chemical Industry Co., Ltd.)), N,N'-diethylthiourea and N,N'-dibutylthiourea; and xanthate vulcanization accelerators such as zinc dibutylxanthate.

When the vulcanization accelerator is used, the content of the vulcanization accelerator in the NBR is, with respect to 100 parts by mass of the NBR, usually 0.1 to 20 parts by mass, preferably 0.2 to 15 parts by mass and more preferably 0.5 to 10 parts by mass. When the content of the vulcanization accelerator is within the above range, no blooming occurs on the surface of a laminate to be obtained and the NBR exhibits excellent crosslinking properties. When a sulfur compound is used as the crosslinking agent, the vulcanizing aid can be used concurrently.

Examples of the vulcanizing aid according to the present invention include zinc oxide (for example, ZnO #1• zinc oxide grade 2, manufactured by HakusuiTech Co., Ltd.), magnesium oxide, and zinc flower (zinc oxide, for example, "META-Z 102" (trade name, manufactured by Inoue Calcium Corp.)).

When the vulcanizing aid is used, the content of the vulcanizing aid in the NBR composition is usually 1 to 20 parts by mass with respect to 100 parts by mass of the NBR.

<Softener>

Examples of the softener according to the present invention include petroleum softeners such as process oil, lubricating oil, paraffin oil, liquid paraffin, petroleum asphalt and vaseline; coal tar softeners such as coal tar; fatty oil softeners such as castor oil, linseed oil, rapeseed oil, soybean oil and coconut oil; waxes such as beeswax and carnauba wax; naphthenic acid, pine oil, and rosin and derivatives thereof; synthetic polymeric substances such as terpene resins, petroleum resins and cumarone indene resins; ester softeners such as dioctyl phthalate and dioctyl adipate; and besides, microcrystalline wax, liquid polybutadiene, modified liquid polybutadiene, hydrocarbon synthetic lubricating oil, tall oil and rubber substitutes (factices); and among these, petroleum softeners are preferable, and process oil is especially preferable.

When the NBR according to the present invention contains the softener, the content of the softener is, with respect to 100 parts by mass of the NBR, usually 2 to 100 parts by mass and preferably 10 to 100 parts by mass.

<Antioxidant (Stabilizer)>

By compounding the NBR according to the present invention with the antioxidant (stabilizer), the life of seal packings formed therefrom can be extended. Such an antioxidant includes conventionally known antioxidants, for example, amine antioxidants, phenolic antioxidants and sulfur antioxidants.

Examples of the antioxidant according to the present invention include aromatic secondary amine antioxidants such as phenylbutylamine and N,N-di-2-naphthyl-p-phenylenediamine; phenolic antioxidants such as dibutylhydroxytoluene and tetrakis[methylene(3,5-di-t-butyl-4-hydroxy)hydro-cinnamate]methane; thioether antioxidants such as bis[2-methyl-4-(3-n-alkylthio propionyloxy)-5-t-butylphenyl] sulfide, dithiocarbamate salt antioxidants such as nickel dibutyldithiocarbamate; and sulfur antioxidants such as 2-mercaptobenzoylimidazole, 2-mercaptobenzimidazole, a zinc salt of 2-mercaptobenzimidazole, dilauryl thiodipropionate and distearyl thiodipropionate.

When the NBR according to the present invention contains the antioxidant, the content of the antioxidant is, with respect to 100 parts by mass of the NBR, usually 0.3 to 10 parts by mass and preferably 0.5 to 7.0 parts by mass. When the content of the antioxidant is within the above range, no blooming occurs on the surface of a laminate to be obtained, and occurrence of the vulcanization inhibition can also be suppressed.

<Processing Aid>

As the processing aid according to the present invention, a broad range of processing aids usually contained in rubbers can be used. The processing aid specifically includes ricinolic acid, stearic acid, palmitic acid, lauric acid, barium stearate, zinc stearate, calcium stearate, zinc laurate, and esters thereof. Among these, stearic acid is preferable.

When the NBR according to the present invention contains the processing aid, the processing aid can suitably be contained usually in an amount of 1 to 3 parts by mass with respect to 100 parts by mass of the NBR. The above range of the content of the processing aid is suitable because of being excellent in processability including kneadability, extrudability and injection moldability.

The above processing aids may be used singly in one kind thereof or in two or more kinds thereof.

<Activator>

Examples of the activator according to the present invention include amines such as di-n-butylamine, dicyclohexylamine and monoethanolamine; diethylene glycol, polyethylene glycol, lecithin, triallyl trimellitate and zinc compounds of aliphatic carboxylic acids or aromatic carboxylic acids; zinc peroxide preparations; octadecyltrimethylammonium bromide, synthetic hydrotalcite, and special quaternary ammonium compounds.

When the NBR according to the present invention contains the activator, the content of the activator is, with respect to 100 parts by mass of the NBR, usually 0.2 to 10 parts by mass and preferably 0.3 to 5 parts by mass.

<Foaming Agent and Foaming Aid>

The laminate formed by using the NBR according to the present invention may be a non-foamed one or a foamed one. When the laminate is a foamed one, it is preferable that the NBR composition contains the foaming agent.

As the foaming agent according to the present invention, any of commercially available ones are suitably used. Examples of such foaming agents include inorganic foaming agents such as sodium bicarbonate, sodium carbonate, ammonium bicarbonate, ammonium carbonate and ammonium nitrite; nitroso compounds such as N,N'-dinitrosoterephthalamide and N,N'-dinitrosopentamethylenetetramine; azo compounds such as azodicarbonamide, azobisisobutyronitrile, azocyclohexylnitrile, azodiaminobenzene and barium azodicarboxylate; sulfonylhydrazide compounds such as benzenesulfonylhydrazide, toluenesulfonylhydrazide and p,p'-oxybis(benzenesulfonylhydrazide)diphenylsulfone-3,3'-disulfonylhydrazide; and azide compounds such as calcium azide, 4,4'-diphenyldisulfonylazide and para-toluenesulfonylazide. Among these, preferably used are azo compounds, sulfonylhydrazide compounds and azide compounds.

When the NBR according to the present invention contains the foaming agent, the content of the foaming agent is suitably selected according to the performance required for the laminate to be produced from the NBR, but the foaming agent is used, with respect to 100 parts by mass of the NBR, usually in the proportion of 0.5 to 30 parts by mass and preferably 1 to 20 parts by mass.

Then, as required, the foaming aid is allowed to be used together with the foaming agent. Addition of the foaming aid has effects on, for example, the regulation of the decomposition temperature of the foaming agent, and the uniformization of bubbles. The foaming aid specifically includes organic acids such as salicylic acid, phthalic acid, stearic acid and oxalic acid, and urea and derivatives thereof.

When the NBR according to the present invention contains the foaming aid, the content of the foaming aid is, with respect to 100 parts by mass of the foaming agent, usually in the proportion of 1 to 100 parts by mass and preferably 2 to 80 parts by mass.

<Saponified Ethylene-Vinyl Acetate Copolymer>

The saponified ethylene-vinyl acetate copolymer forming the laminate of the present invention is a copolymer, of ethylene with a vinyl alcohol, which is referred to also as an ethylene-vinyl alcohol copolymer.

In the saponified ethylene-vinyl acetate copolymer according to the present invention, the ethylene content rate is, though not especially limited to, usually in the range of 20 to 50% by mol and preferably 24 to 35% by mol. The MFR (load: 2,160 g, measurement temperature: 190° C.) of the saponified ethylene-vinyl acetate copolymer according to the present invention is, as long as the copolymer has melt extrusion moldability, though not especially limited to, usually in the range of 1.6 to 6.4 g/10 min.

The saponified ethylene-vinyl acetate copolymer according to the present invention is produced and sold, specifically, in trade name of Eval by Kuraray Co., Ltd., and in trade name of Soarnol by Nippon Synthetic Chemical Industry Co., Ltd.

«Ethylene-Vinyl Acetate Copolymer»

The ethylene-vinyl acetate copolymer forming the laminate of the present invention is a copolymer of ethylene with vinyl acetate, wherein the content of vinyl acetate present in the copolymer is usually in the range of 5 to 50% by weight and preferably 5 to 40% by weight.

The melt flow rate (MFR) of the ethylene-vinyl acetate copolymer according to the present invention is, as a value measured according to JIS K7210 [190° C., a load of 2.16 kg], usually in the range of 1.6 to 6.4 g/10 min and preferably 1.6 to 4.6 g/10 min.

The ethylene-vinyl acetate copolymer according to the present invention may be a modified copolymer made by being graft modified with an unsaturated silane compound. The amount of the unsaturated silane compound grafted in this case is usually in the range of 0.01 to 5% by weight and preferably 0.02 to 3% by weight.

The modified copolymer according to the present invention is obtained by various known methods, for example, a method of carrying out by graft modifying an ethylene-vinyl acetate copolymer in the presence of a radical initiator or in the non-presence thereof. At this time, when the graft modification is carried out in the presence of a radical initiator, graft modification with the unsaturated silane compound can efficiently be carried out.

Examples of such a radical initiator to be used includes an organic peroxide and an azo compound. Such a radical initiator specifically includes benzoyl peroxide, dichlorobenzoyl peroxide, dicumyl peroxide, di-t-butyl peroxide, 2,5-dimethyl-2,5-di(peroxide benzoate)hexyne-3,1,4-bis(t-butylperoxyisopropyl)benzene, lauroyl peroxide, t-butyl peracetate, 2,5-dimethyl-2,5-di-(t-butyl peroxide)hexyne-3, 2,5-dimethyl-2,5-di(t-butylperoxide) hexane, t-butyl perbenzoate, t-butyl perphenylacetate, t-butyl perisobutyrate, t-butyl per-sec-octoate, t-butyl perpivalate, cumyl perpivalate, t-butyl perdiethyl acetate; azobisisobutyronitrile, and dimethyl azoisobutyrate.

Among these, preferably used are dialkyl peroxides such as dicumyl peroxide, di-t-butyl peroxide, 2,5-dimethyl-2,5-di(t-butylperoxy)hexyne-3, 2,5-dimethyl-2,5-di(t-butylperoxy)hexane, and 1,4-bis(t-butylperoxyisopropyl)benzene.

<Unsaturated Silane Compound>

Examples of the unsaturated silane compound to be grafted to the ethylene-vinyl acetate copolymer include various known compounds, vinylsilanes such as vinyltrimethoxysilane, vinyltriethoxysilane, vinyl(β-methoxyethoxy)silane and vinyltriacetoxysilane, and acrylic silanes such as acryloxypropyltrimethoxysilane and methacryloxypropyltrimethoxysilane.

<Laminate>

The laminate of the present invention is a laminate made by laminating a layer of the above NBR composition with the above saponified ethylene-vinyl acetate copolymer layer.

The thicknesses of the layer of the NBR composition and the saponified ethylene-vinyl acetate copolymer layer which constitute the laminate of the present invention are not especially limited, but the thickness of the layer of the NBR composition is usually 0.1 to 30 mm and preferably 1 to 5 mm, and that of the saponified ethylene-vinyl acetate copolymer layer is usually 0.1 to 30 mm and preferably 1 to 5 mm. The whole thickness of the laminate is, though not especially limited to, usually 1 to 31 mm and preferably 5 to 20 mm.

The laminate of the present invention is a laminate made by laminating the above NBR layer with the above saponified ethylene-vinyl acetate copolymer layer through the above ethylene-vinyl acetate copolymer layer.

The NBR layer constituting the laminate comprises a layer of the above NBR composition.

The thicknesses of the NBR layer and the saponified ethylene-vinyl acetate copolymer layer which constitute the laminate of the present invention are not especially limited, but the thickness of the NBR layer is usually 0.1 to 30 mm and preferably 1 to 5 mm, and that of the saponified ethylene-vinyl acetate copolymer layer is usually 0.1 to 30 mm and preferably 1 to 5 mm.

Further, the thickness of the ethylene-vinyl acetate copolymer layer is, though not especially limited to, usually in the range of 30 to 300 μm and preferably 30 to 250 μm.

Further, the whole thickness of the laminate is, though not especially limited to, usually 1 to 31 mm and preferably 5 to 20 mm.

The laminate of the present invention can be made by various known molding methods, specifically, for example, by a method of coextruding the NBR and the saponified ethylene-vinyl acetate copolymer with the ethylene-vinyl acetate copolymer as the middle layer to make the laminate, a method in which the NBR, the ethylene-vinyl acetate copolymer and the saponified ethylene-vinyl acetate copolymer are separately extruded or pressed and thereafter, the NBR layer and the saponified ethylene-vinyl acetate copolymer layer are laminated through the ethylene-vinyl acetate copolymer layer, a method in which the ethylene-vinyl acetate copolymer layer is extrusion laminated on the NBR layer or the saponified ethylene-vinyl acetate copolymer layer, and thereafter laminated on the saponified ethylene-vinyl acetate copolymer layer or the NBR layer, and various molding methods including injection molding, calender molding and blow molding.

Further, the laminate of the present invention can be made, for example, by a method of coextruding the NBR composition and the saponified ethylene-vinyl acetate copolymer to make the laminate, a method in which the NBR and the saponified ethylene-vinyl acetate copolymer are separately extruded or pressed and thereafter, the layer of the NBR composition and the saponified ethylene-vinyl acetate copolymer layer are laminated, and various molding methods including injection molding, calender molding and blow molding.

The laminate of the present invention is suitably used for various applications requiring oil resistance, heat resistance and gas permeability resistance, for example, as tubes or hoses such as tubes or hoses for automobile fuel piping, tubes or hoses for automobile cooling system piping, automobile radiator hoses, brake hoses, air conditioner hoses, electric wire covering materials and optical fiber covering materials, films or sheets such as agricultural films, linings, interior materials for buildings (for example wall papers) and laminate steel sheets, and tanks such as automobile radiator tanks, chemical liquid bottles, chemical liquid tanks, chemical liquid containers and gasoline tanks. The laminate structure of the present invention, since being low in fuel permeability, is especially useful as tubes or hoses for automobile fuel piping.

EXAMPLES

Hereinafter, the present invention will be described in more detail by way of Examples, but the present invention is not limited to these Examples.

For example polymers used in Examples and Comparative Examples are shown in the below.
(1) An NBR: Trade Name: Nipol 1042, Amount of Acrylonitrile (AN) Bonded: 33.5%, ML (1+4) 100° C.: 77.5, Noncontaminating, Specific Gravity: 0.98 [Manufactured by Zeon Corp.]
(2) Ethylene-Vinyl Acetate Copolymers
(2-1) An Ethylene-Vinyl Acetate Copolymer Trade name: Evaflex, brand: EVA150, MFR: 30 g/10 min, VA content: 33% by weight, density: 960 kg/m$^3$, manufactured by Du Pont-Mitsui Polychemicals Co., Ltd. was used as an ethylene-vinyl acetate copolymer (EVA-1).
(2-2) A Silane-Modified Ethylene-Vinyl Acetate Copolymer A silane-modified ethylene-vinyl acetate copolymer used in Examples (modified EVA) was produced by the following Production Example 1.

Production Example 1

100 parts by mass of an ethylene-vinyl acetate copolymer [trade name: Evaflex, brand: EV260 (MFR: 6 g/10 min, density: 950 kg/m$^3$, vinyl acetate content: 28% by weight, manufactured by Du Pont-Mitsui Polychemicals Co., Ltd.), 1.7 parts by mass of vinyltrimethoxysilane, 0.15 part by mass of dicumyl peroxide and 0.03 part by mass of dodecylmercaptane were mixed, fed to a 65-mmφ multi-screw extruder and melt kneaded and extruded at an extrusion temperature of 200° C. or higher, and thereafter cooled and pelletized to thereby obtain a silane-modified ethylene-vinyl acetate copolymer (modified EVA).

(3) A Saponified Ethylene-Vinyl Acetate Copolymer

As a film composed of a saponified ethylene-vinyl acetate copolymer, there was used a film (EVOH film) of EVOH trade name: F101B [manufactured by Kuraray Co., Ltd.] of 180° C. in melting point and 100 μm in thickness.

The EVOH film, before being laminated with NBR, was dried at 100° C. for 3 hours under reduced pressure, and stored in a package container.

Example 1

(Preparation of an NBR Composition)

As the first stage, the above NBR was masticated for 30 s by using a BB-2 type Banbury mixer (manufactured by KOBE Steel, Ltd.); and then to 100 parts by mass of the NBR were added 5 parts by mass of zinc oxide (manufactured by Inoue Calcium Corp.), 40 parts by mass of FEF carbon black (Asahi #60UG, manufactured by Asahi Carbon Co., Ltd.), and 1 part by mass of stearic acid, and the mixture was kneaded at 140° C. for 2 min. Thereafter, the ram was lifted and cleaning was carried out, and the resultant was further kneaded for 1 min and then discharged at about 150° C. to obtain a first-stage compound.

Then, as the second stage, the compound obtained in the first stage was wound on an 8-inch roll (manufactured by Nippon Roll Mfg. Co., Ltd., front roll surface temperature: 50° C., rear roll surface temperature: 50° C., front roll rotating speed: 16 rpm, rear roll rotating speed: 18 rpm); and there was added thereto, 0.7 part by mass of N-tert-butyl-2-benzothiazolylsulfenamide (Nocceler NS-P, manufactured by Ouchi Shinko Chemical Industrial Co., Ltd.) and 1.5 parts by mass of sulfur, and kneaded for 10 min to thereby obtain an uncrosslinked NBR composition (NBR compound).
(Fabrication and Evaluation of a Laminate)
(Fabrication of a Laminate for a T-Type Peel Test)

The NBR composition obtained in the above preparation of an NBR composition was sheeted in a sheet form. Then, upper and lower sides of the sheeted NBR composition sheet of 50 g were interposed between stretched polyethylene terephthalate films (manufactured by Toray Industries, Inc., Lumilar). The NBR composition sheet whose upper and lower sides had been interposed between the Lumilar films was pressed at 120° C. for 2 min by using a 50-ton press molding machine to make an NBR composition sheet of 1 mm in t (thickness) and 20 cm square.

The NBR composition sheet (layer 1) having been pressed was cut into a size for main pressing (15 cm×15 cm×t=1 mm). After the cutting, the upper and lower Lumilar films were separated off.

Then, the EVOH film (layer 3) having been dried at 110° C. for 3 hours under vacuum was cut into the size for main pressing (15 cm×15 cm×t=1 mm).

A film (layer 2) of 250 μm in thickness was prepared by using the modified EVA.

Then, the sheet (layer 1), the film (layer 2) as the middle layer, and the film (layer 3) were superposed.

In the superposing, the layer (1), the layer (2) and the layer (3) were superposed in the state that Lumilar films (t: 0.2 mm) were tucked in interlaminar parts (3 cm in width, 15 cm in length: grip margin in the peel test), and then, the superposed sheet and films with the Lumilar films tucked in the parts were pressed (main pressing) at 180° C. for 10 min by using a 100-ton press molding machine to crosslink the NBR sheet to thereby obtain a laminate of 2 mm in thickness.

The Lumilar films were removed from the obtained laminate; then, the NBR composition sheet [layer (1)] and the modified EVA layer or the EVA-1 layer [layer (2)], or the modified EVA layer or the EVA-1 layer [layer (2)] and the EVOH layer [layer (3)] were interlaminarly peeled by hand; and the peelability (adhesiveness) was evaluated in 5 ranks of 1 to 5 by determining the case where no adhesion was observed, as 1 in the ranks and the state that they were unable to be peeled by hand due to firm adhesion, as 5 therein, and the state of the EVOH layer was observed.

Evaluation results are shown in Table 1.

Example 2

A laminate was obtained as in Example 1, except for using the EVA-1 in place of the modified EVA used in Example 1. Evaluation results are shown in Table 1.

Comparative Example 1

A laminate was obtained by directly laminating the sheet (layer 1) with the film (layer 3) without using the modified EVA used as the middle layer in Example 1. Evaluation results are shown in Table 1.

Example 3

A laminate was obtained as in Example 1, except for using a masterbatch containing 40% of dicumyl peroxide (DCP-40C, manufactured by NOF Corp.) in place of Nocceler NS-P and sulfur used in Example 1. Evaluation results are shown in Table 1.

Example 4

A laminate was obtained as in Example 3, except for using the EVA-1 in place of the modified EVA used in Example 3. Evaluation results are shown in Table 1.

Comparative Example 2

A laminate was obtained by directly laminating the sheet (layer 1) with the film (layer 3) without using the modified EVA used as the middle layer in Example 3. Evaluation results are shown in Table 1.

[Table 1]

TABLE 1

|  |  |  | Example 1 | Example 2 | Comparative Example 1 | Example 3 | Example 4 | Comparative Example 2 |
|---|---|---|---|---|---|---|---|---|
| NBR Composition Layer (Layer 1) | | | | | | | | |
| First Stage | Nipol 1042 | Parts by mass | 100 | 100 | 100 | 100 | 100 | 100 |
| | ZnO | Parts by mass | 5 | 5 | 5 | 5 | 5 | 5 |
| | Stearic acid | Parts by mass | 1 | 1 | 1 | 1 | 1 | 1 |
| | FEF CARBON | Parts by mass | 40 | 40 | 40 | 40 | 40 | 40 |
| Second Stage | DCP-40C | Parts by mass | | | | 6.8 | 6.8 | 6.8 |
| | NS | Parts by mass | 0.7 | 0.7 | 0.7 | | | |
| | Sulfur | Parts by mass | 1.5 | 1.5 | 1.5 | | | |
| | Total [phr] | Parts by mass | 148.2 | 148.2 | 148.2 | 152.8 | 152.8 | 152.8 |
| EVA Layer (Layer 2) | | | Modified EVA | EVA-1 | — | Modified EVA | EVA-1 | — |
| EVOH Layer (Layer 3) | | | EVOH FILM | EVOH FILM | EVOH FILM | EVOH FILM | EVOH FILM | EVOH FILM |
| <Evaluation of Adhesiveness> | | | | | | | | |
| Cracking of Layer 3 | | | Absent | Absent | Absent | Present | Present | Absent |
| Adhesiveness of Layer 1/Layer 3 | | | — | — | 1 | — | — | 2 |
| Adhesiveness of Layer 1/Layer 2 | | | 5 | 4 | — | 5 | 5 | — |
| Adhesiveness of Layer 2/Layer 3 | | | 5 | 5 | — | 5 | 5 | — |

Example 5

(Preparation of an NBR Composition)

As the first stage, the above NBR was masticated for 30 s by using a BB-2 type Banbury mixer (manufactured by KOBE Steel, Ltd.); and then to 100 parts by mass of the NBR were added 10 parts by mass of the silane-modified EVA, 5 parts by mass of zinc oxide (manufactured by Inoue Calcium Corp.), 40 parts by mass of FEF carbon black (Asahi #60UG, manufactured by Asahi Carbon Co., Ltd.) and 1 part by mass of stearic acid, and the mixture was kneaded at 140° C. for 2 min. Thereafter, the ram was lifted and cleaning was carried out, and the resultant was further kneaded for 1 min and then discharged at about 150° C. to obtain a first-stage compound.

Then, as the second stage, the compound obtained in the first stage was wound on an 8-inch roll (manufactured by Nippon Roll Mfg. Co., Ltd., front roll surface temperature: 50° C., rear roll surface temperature: 50° C., front roll rotating speed: 16 rpm, rear roll rotating speed: 18 rpm); and there was added thereto, 0.7 part by mass of N-tert-butyl-2-benzothiazolylsulfenamide (Nocceler NS-P, manufactured by Ouchi Shinko Chemical Industrial Co., Ltd.) and 1.5 parts by mass of sulfur, and kneaded for 10 min to thereby obtain an uncrosslinked NBR composition (NBR compound).

(Fabrication and Evaluation of a Laminate)
(Fabrication of a Laminate for a T-Type Peel Test)

The NBR composition obtained in the above preparation of an NBR composition was sheeted in a sheet form. Then, upper and lower sides of the sheeted NBR composition sheet of 50 g were interposed between stretched polyethylene terephthalate films (manufactured by Toray Industries, Inc., Lumilar). The NBR composition sheet whose upper and lower sides had been interposed between the Lumilar films was pressed at 120° C. for 2 min by using a 50-ton press molding machine to make an NBR composition sheet of 1 mm in t (thickness) and 20 cm square.

Then, the NBR composition sheet (layer 1) having been pressed was cut into a size for main pressing (15 cm×15 cm×t=1 mm). After the cutting, the upper and lower Lumilar films were separated off.

Then, the EVOH film (layer 2) having been dried at 110° C. for 3 hours under vacuum was cut into the size for main pressing (15 cm×15 cm×t=1 mm). Then, the sheet (layer 1) and the film (layer 2) were superposed. In the superposing, the sheet and the film were superposed in the state that a Lumilar film (t: 0.2 mm) was tucked in a part (3 cm in width, 15 cm in length: grip margin in the peel test) of the NBR composition sheet, and then, the superposed sheet and film with the Lumilar film tucked in the part were pressed (main pressing) at 180° C. for 10 min by using a 100-ton press molding machine to crosslink the NBR sheet to thereby obtain a laminate of 2 mm in thickness.

The Lumilar film was removed from the obtained laminate; then, the NBR composition sheet and the EVOH film were interlaminarly peeled by hand; and the peelability (adhesiveness) was evaluated in 5 ranks of 1 to 5 by determining the case where no adhesion was observed, as 1 in the ranks and the state that they were unable to be peeled by hand due to firm adhesion, as 5 therein, and the state of the EVOH film was observed.

Evaluation results are shown in Table 2.

Example 6

An NBR composition and a laminate were obtained as in Example 5, except for using a masterbatch containing 40% of dicumyl peroxide (DCP-40C, manufactured by NOF Corp.) in place of Nocceler NS-P and sulfur used in Example 5.

Evaluation results are shown in Table 2.

Comparative Example 3

An NBR composition and a laminate therefrom were obtained as in Example 5, except for using an NBR composition without the silane-modified EVA in place of the NBR composition used in Example 5.

Evaluation results are shown in Table 2.

Comparative Example 4

An NBR composition and a laminate therefrom were obtained as in Example 6, except for using an NBR composition without the silane-modified EVA in place of the NBR composition used in Example 6.

Evaluation results are shown in Table 2.

TABLE 2

| | | | Example 5 | Example 6 | Comparative Example 3 | Comparative Example 4 |
|---|---|---|---|---|---|---|
| NBR Composition Layer Layer (1) | | | | | | |
| First Stage | Nipol 1042 | Parts by mass | 100 | 100 | 100 | 100 |
| | Silane-modified EVA | Parts by mass | 10 | 10 | | |
| | ZnO | Parts by mass | 5 | 5 | 5 | 5 |
| | Stearic acid | Parts by mass | 1 | 1 | 1 | 1 |
| | FEF CARBON | Parts by mass | 40 | 40 | 40 | 40 |
| Stage Second | DCP-40C | Parts by mass | | 6.8 | | 6.8 |
| | NS | Parts by mass | 0.7 | | 0.7 | |
| | Sulfur | Parts by mass | 1.5 | | 1.5 | |
| | Total [phr] | Parts by mass | 158.2 | 162.8 | 148.2 | 152.8 |
| <Evaluation of Adhesiveness> | | | | | | |
| | Cracking of EVOH Film | | Absent | Present | Absent | Absent |
| | Adhesiveness | | 3 | 4 | 1 | 2 |

The invention claimed is:

1. A laminate, comprising an acrylonitrile-butadiene rubber layer comprising a composition and a saponified ethylene-vinyl acetate copolymer layer through an ethylene-vinyl acetate copolymer layer,
   wherein the composition comprises an acrylonitrile-butadiene rubber; a silane-modified ethylene-vinyl acetate copolymer of 0 to 50 parts by mass with respect to 100 parts by mass of the acrylonitrile-butadiene rubber; and a filler of 100 to 300 parts by mass with respect to 100 parts by mass of the above acrylonitrile-butadiene rubber,
   wherein the thickness of the layer of the saponified ethylene-vinyl acetate copolymer layer is 0.1 to 30 mm, and
   wherein the acrylonitrile-butadiene rubber layer is cross-linked.

2. The laminate according to claim 1, wherein the ethylene-vinyl acetate copolymer layer comprises a silane-modified ethylene-vinyl acetate copolymer.

3. A laminate, comprising: a layer of an acrylonitrile-butadiene rubber composition and a saponified ethylene-vinyl acetate copolymer layer,
   wherein the acrylonitrile-butadiene rubber composition comprises an acrylonitrile-butadiene rubber; and a silane-modified ethylene-vinyl acetate copolymer of 2 to 50 parts by mass with respect to 100 parts by mass of the acrylonitrile-butadiene rubber, and
   wherein the thickness of the layer of the saponified ethylene-vinyl acetate copolymer layer is 0.1 to 30 mm.

* * * * *